United States Patent Office 3,273,185
Patented Sept. 20, 1966

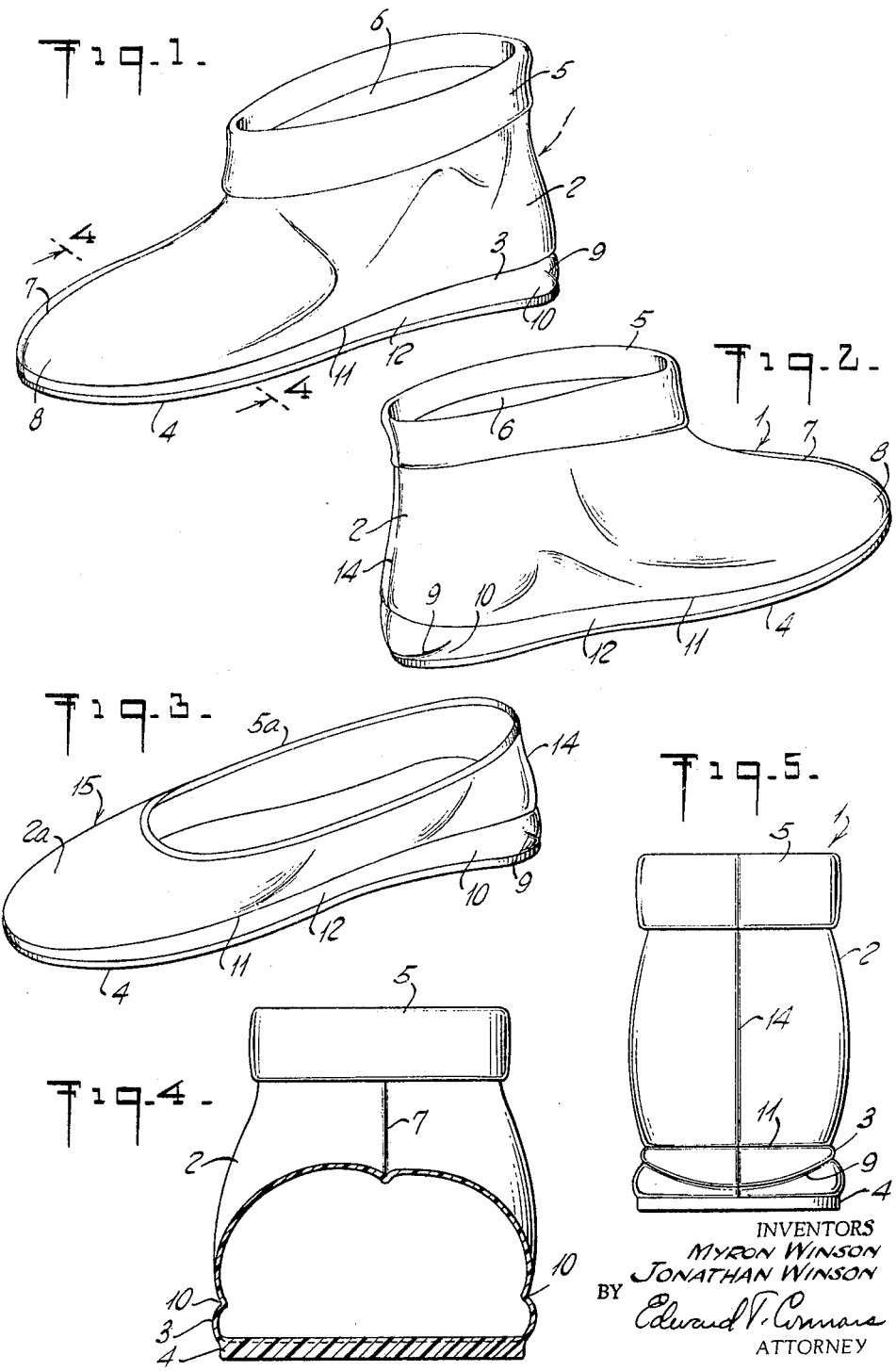

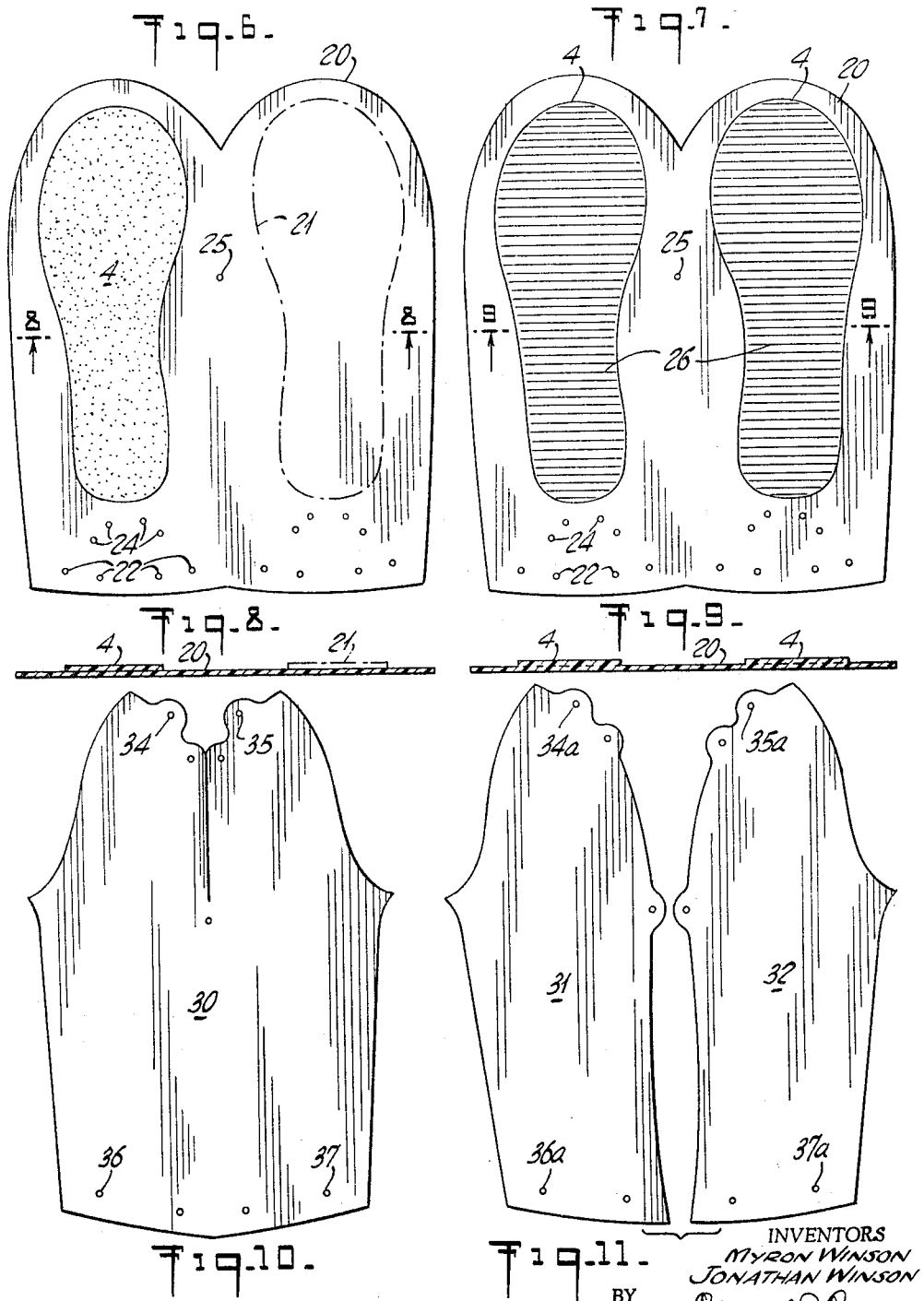

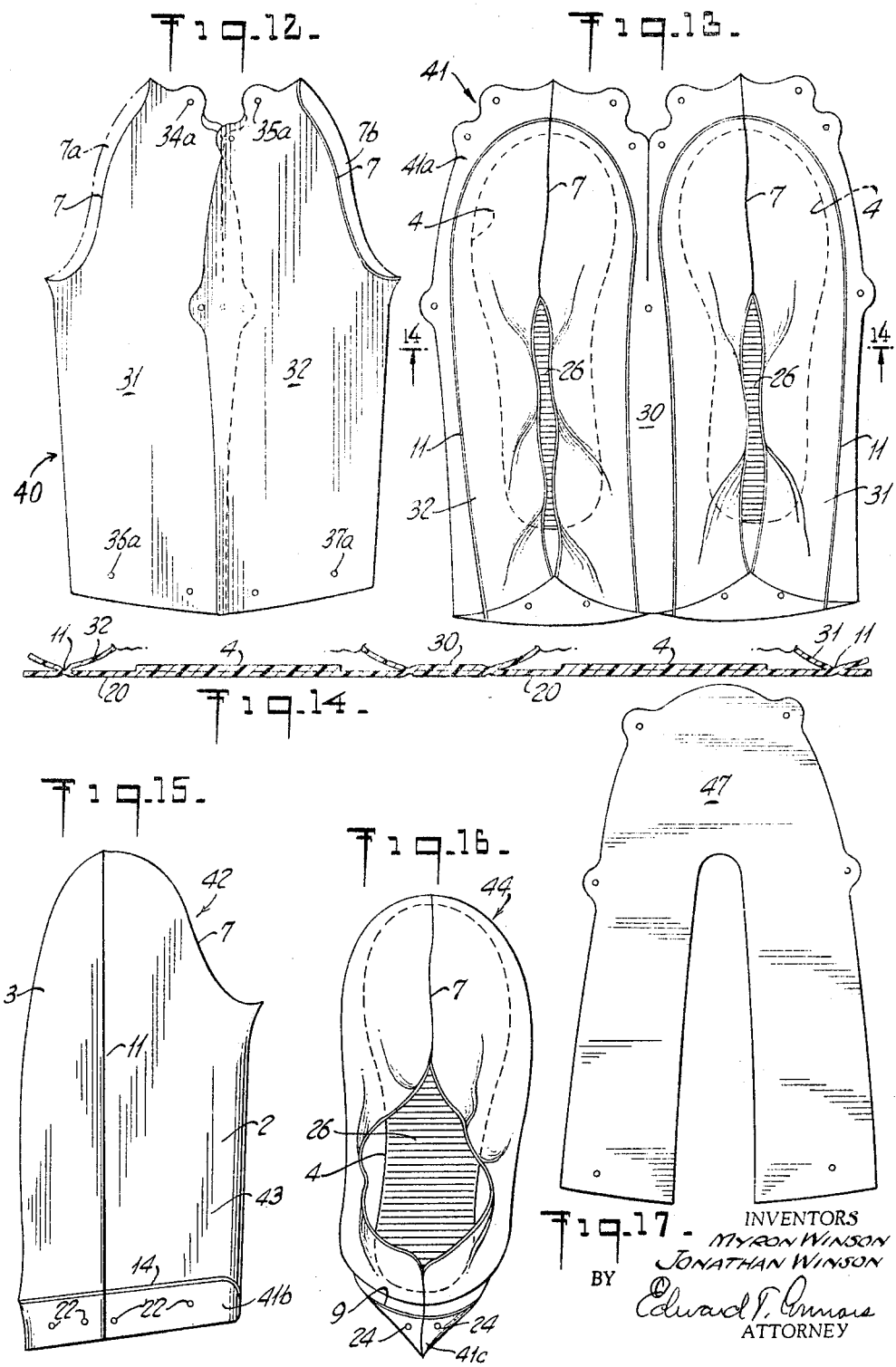

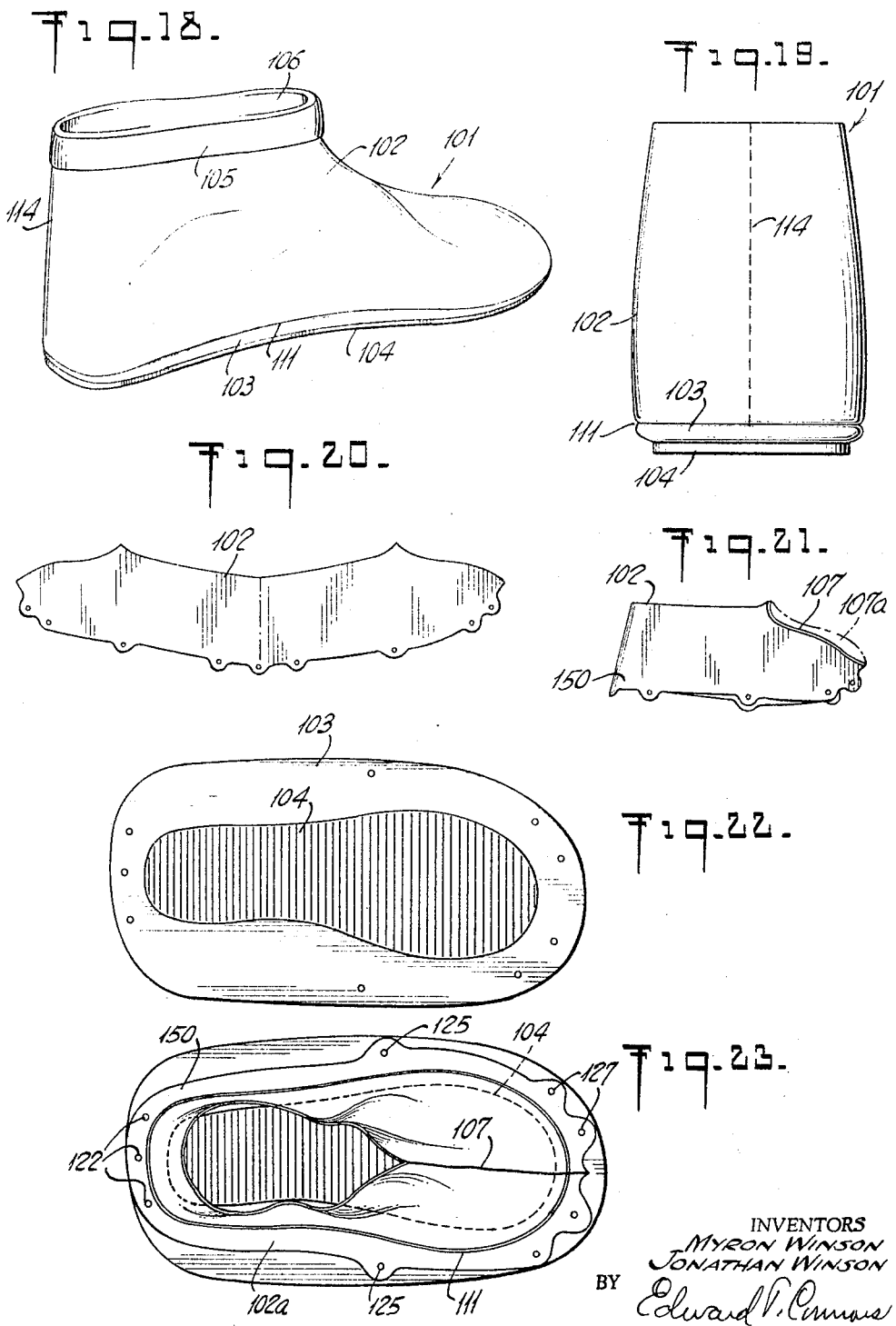

3,273,185
METHOD OF MAKING AN ELECTRONICALLY HEAT SEALED FOOT COVERING
Myron Winson, 15 S. Gate Drive, Spring Valley, N.Y., and Jonathan Winson, 793 East Drive, Oradell, N.J.
Original application July 26, 1963, Ser. No. 297,896. Divided and this application Feb. 1, 1966, Ser. No. 524,271
6 Claims. (Cl. 12—142)

The present application is a division of our copending application Serial No. 297,896, filed July 26, 1963.

The present invention relates to foot coverings and methods of manufacture thereof, and more particularly to foot coverings made by electronic heat sealing of thermoplastic sheeting.

The art of making foot coverings is an old one and is practiced by carefully forming flat material such as leather and cloth into the complicated shape of the foot through the use of many manufacturing operations. These operations are generally time consuming, complicated and require a great amount of hand labor. There is a wealth of art in this field all dealing with the many variations of lasting uppers, attaching soles, making insoles and the other numerous operations known in the field. However, such shoes, slippers and other foot coverings are generally expensive to manufacture and require large capital investment and large plants and labor forces for their production.

Attempts to make foot coverings by rapid mass production means generally have been confined to molding processes, the products in many cases being unsatisfactory because of their appearances. In addition, it is seldom possible to achieve a lasted appearance with any of the mass production means known.

The present invention overcomes the difficulties and disadvantages of prior foot coverings by providing a new foot covering and a new method of manufacture thereof which incorporates the use of flat electronic die electrode heat sealing in producing foot coverings having a rich and lasted appearance and which can be produced at very low cost.

Flat electronic heat sealing of the type using a die electrode and associated automatic equipment is known to be an extremely efficient method of production, far surpassing sewing in its speed. It is, however, severely limited by the fact that the seals must be flat and the flat sheeting can not be stretched or otherwise distorted during the heat sealing operation. As a result, this very efficient method has not been applicable to many fields such as footwear in which the products are complicated in shape. The present invention provides an ingenious construction whereby foot coverings can be made by die electrode electronic heat sealing of undistorted flat sheeting. These foot coverings are made of any suitable thermoplastic material which may be electronically heat sealed or of impregnations of cloth with such material, all of which are hereinafter termed "thermoplastic sheeting."

In accordance with the invention a foot covering and a method of manufacture thereof is provided using thermoplastic sheeting for upper and lower blanks which are attached together by the use of an upper-lower heat seal of the type made by a die electrode. The upper-lower heat seal is so shaped and so positioned that the outside part of the lower blank becomes the lower part of the sidewall of the finished product.

Additionally, in one form of the invention, the upper-lower heat seal is open at the counter end and a counter seal is used to close the counter end of the foot covering. This seal draws the entire lower blank in the heel region into the sidewall and a pinch type heel seal is then made which, in effect, returns a part of the lower blank to the sole portion in the heel region. In another form of the invention the upper-lower heat seal is continuous around the periphery of the foot covering and is so shaped and so positioned that the outside part of the lower blank becomes the lower part of the sidewall of the finished product.

An object of the invention is to provide a foot covering which is simple and economical in manufacture, attractive in appearance and durable in use. Other objects and advantages of the invention will be apparent from the accompanying drawings which show, by way of examples, embodiments of the invention.

In the drawings:

FIGURE 1 is a perspective view of a foot covering made in accordance with the invention. The toe is directed towards the left of the drawing and a heat seal is shown along the instep.

FIGURE 2 is a perspective view of the foot covering according to FIGURE 1 with the toe directed towards the right.

FIGURE 3 is a perspective view of a foot covering corresponding to FIGURE 1 excepting that the upper is so fashioned as to produce a ballerina type slipper.

FIGURE 4 is a sectional view taken along the line 4—4 of FIGURE 1.

FIGURE 5 is a rear view of the foot covering shown in FIGURE 1.

FIGURE 6 is a top view of a dual bottom blank with one sole placed in position, the dash-dotted line indicating the position for a second sole member.

FIGURE 7 is a view of the dual blank of FIGURE 6 after the sole members have been heat sealed into position.

FIGURES 8 and 9 are cross sectional views taken along the lines 8—8 and 9—9 respectively of FIGURES 6 and 7.

FIGURE 10 is a dual blank which will later be separated forming inner sidewalls of a pair of the foot coverings.

FIGURE 11 shows a pair of side blanks to be sealed to the blank shown in FIGURE 10 forming outer sidewalls of the pair of foot coverings.

FIGURE 12 is a sealed dual blank assembly of the upper blanks shown in FIGURES 10 and 11, the blanks being sealed together along their instep portions.

FIGURE 13 is a sealed dual blank assembly of the assemblies of FIGURES 7 and 12.

FIGURE 14 is a sectional view of the lower portion of the dual blank shown in FIGURE 13 taken along the line 14—14 thereof and drawn at an enlarged scale.

FIGURE 15 shows one of the sealed assemblies of FIGURE 13 after the ends of the counter portion have been positioned together with the lower folded on itself in the heel region and the counter seal completed.

FIGURE 16 shows the sealed assembly of FIGURE 15 after it has been allowed to assume a relaxed state with the lower blank substantially flat and after a heel seal has been made pinching off excess material in the heel.

FIGURE 17 shows a single upper blank for the manufacture of the ballerina type foot covering shown in FIGURE 3. In making the ballerina type foot covering this blank is substituted for one of the dual assemblies of FIGURE 12 in making an assembly substituting for one of the dual assemblies of FIGURE 13.

FIGURE 18 is a perspective view of a modified foot covering in accordance with the invention and in which the upper-lower heat seal is continuous around the periphery of the foot covering, the upper blank being heat sealed at its instep.

FIGURE 19 is a back view of the foot covering shown in FIGURE 18.

FIGURE 20 is an upper blank at reduced scale for the foot covering of FIGURE 18.

FIGURE 21 is a side view of the blank of FIGURE 20 after it has been folded over itself and an instep seal made.

FIGURE 22 is a bottom blank for the foot covering of FIGURE 18 with the sole shown heat sealed in position.

FIGURE 23 shows the sealed assembly of the blanks of FIGURES 21 and 22 for making the foot covering of FIGURE 18.

Referring to the drawings there is shown in FIGURE 1 a foot covering 1 in accordance with the invention and including an upper portion 2, a lower portion 3 to which is attached a sole 4. A decorative top 5 is shown about the ankle opening 6. An instep seal 7 extends over toe portion 8 of the foot covering while a heel seal 9 is visible at the rear of the heel 10. An upper-lower seal 11 extends around the periphery of the foot covering being spaced somewhat greater generally from the sole 4 in the shank portion 12 and heel portion 10 than at the toe portion 8. A counter seal 14 together with the heel seal 9 are visible in FIGURES 2 and 5.

In FIGURE 3 there is shown a foot covering in the form of a ballerina type slipper 15 generally corresponding to the foot covering 1 of FIGURE 1 excepting that its upper 2a is made of decreased height and in one piece without the instep seal 7, the decorative edge 5a being somewhat narrower than the decorative top 5 of the foot covering 1. As will appear hereinafter, the construction of the ballerina type foot covering 15 is substantially the same as that of foot covering 1 excepting that the upper blank 2a differs from the upper blank 2 in its shape and it is made preferably in one piece.

The steps of the assembly operation and the blanks used therein for the foot covering 1 are shown in FIGURES 6 through 16. It will be noted that a complete pair of foot coverings may be made simultaneously by the use of dual blanks.

In FIGURES 6 and 8 there is a dual lower blank 20 having a sole 4 positioned thereon, the dashed-dotted line 21 indicating the position for a corresponding sole member. A group of pegholes indicated by the numerals 22 are used for holding the blanks while the counter seal 14 is made. Peg holes 24 are used for holding the blank while making the heel seal 9 as will be explained later. Any of these peg holes together with peg holes 25 may be used for holding the blank 20 in place on a flat tray (not shown) for the sealing of the sole members 4 in position and for holding the blank 20 for other operations. In FIGURES 7 and 9 the blank 20 is shown with the sole members 4 sealed in position. During the sealing operation any suitable embossing may be performed on the sole members 4 as exemplified by transversely extending ridges 26.

In FIGURE 10 there is shown a dual blank 30 which is to be split to form the upper inner side walls of a pair of foot coverings. In FIGURE 11 there is shown blanks 31 and 32 which cooperate with the blank 30 to form the upper outer sidewalls of a pair of foot coverings. The instep seal 7 is made as shown in FIGURE 12 while the blank 30 is held in position with its peg holes 34, 35, 36 and 37 over suitable pegs which also receive the peg holes 34a, 35a, 36a, and 37a of blanks 31 and 32. In FIGURE 12 the seal 7 is shown with the tear edge surplus torn away as indicated at 7a on the lefthand side of the assembly. On the righthand side of the assembly the seal 7 is shown in position but with the surplus edge 7b still shown in position. The completed preassembly of the upper portion 2 is indicated by the numeral 40.

In FIGURE 13 there is shown a sealed assembly 41 of the dual lower blank 20 and the dual upper blank 40. The seals 11 are of the tear type so that the surplus material 41a may be pulled away and the upper-lower assemblies separated.

It will be noted that the seal 11 has been made by a die electrode of generally U-shape and so dimensioned that the heat seal 11 is spaced from the periphery of the sole 4 a short distance in the toe region, the space increasing in the direction of the shank and heel.

One of the separated upper-lower assemblies 41 is shown in FIGURE 15 and identified as 42 after it has been placed with the contiguous portions of its counter 43 of the upper 2 positioned together and the heel of the lower portion 3 folded over on itself so as to position the parts to provide a flat surface held in position by pegs extending through the peg holes 22 for the making of the tear type counter seal 14. The surplus material 41b thereafter may be torn away.

The sealed assembly 42 of FIGURE 15 is allowed to assume a relaxed state with its lower blank substantially flat as shown in FIGURE 16 with the peg holes 24 in position over positioning pegs. The heel seal 9 is made and the surplus material 41c torn away completing assembly 44 of FIGURE 16. If desired the seal 9 may have an arcuate shape being generally perpendicular to the counter seal 14 at the intersection therewith.

The assembly 44 is then turned inside out so that the sole 4 is on the outer surface of the lower portion and the foot covering presents reversed seams on its outer side.

In a supplementary optional treatment the reversed or turned inside out blank 44 may be placed on a shaping last and heated for a short time to a temperature ranging around 100 degrees Fahrenheit and thereafter allowed to cool, the temperature depending upon the thermoplastic material used. This operation results in the elimination of small irregularities which may have resulted from the handling of the foot covering through the heat sealing operation.

In FIGURE 17 there is shown an upper blank 47 for making the ballerina type foot covering 15 of FIGURE 3. It will be noted that the blank 47 is made in one piece, although obviously, if desired, an instep seam might be made as described heretofore. However, by using the one piece blank 47, the instep seam sealing step is omitted. In the assembly of the ballerina type foot covering 15 the blank 47 is substituted for one of the dual units of the assembly 40 of FIGURE 12 in making one of the sealed blanks 41 of FIGURE 13, the remaining steps being as described in making the blank 44.

Referring to FIGURES 18 through 23 there is shown another embodiment of the invention which differs somewhat from the first embodiment heretofore described in that the upper-lower heat seal is continuous around the periphery of the foot covering eliminating the necessity for the counter and heel seals. However, in both embodiments the construction is such and the upper-lower heat seal is so shaped and so positioned that the outer edge of the lower blank becomes the lower part of the sidewall of the finished foot covering. In the embodiment of FIGURES 18 through 23 corresponding numerals are used where practical as heretofore with the addition of 100.

In FIGURE 18 there is a perspective view of a foot covering 101 in accordance with the invention and including an upper 102, a lower 103 with a sole 104. A decorative top 105 is applied about the ankle opening 106. No seal is necessary in the counter 114 although one might be used as for example to utilize small pieces of sheet material to make the upper 102, to enhance the appearance of the foot covering, or to close the upper in the absence of an instep seal. An optional counter seal is indicated by the dotted line 114 of FIGURE 19.

In the case in which an instep seal is to be used, the upper 102 may be formed from a blank as shown in FIGURE 20 and folded over upon itself and heat sealed to form the instep seal 107, the surplus material 107a being torn away. The lower blank 103 is shown in FIGURE 22 with a sole 104 in position and facing upwardly. The sealed upper 102 of FIGURE 21 is placed over the lower 103 of FIGURE 22 with lower edge 150 of the blank 102 flared outwardly and held in position by engagement of the peg holes 122, 125 and 127 with suitable pegs on a tray. The single continuous heat seal 111 is made with a die electrode and the surplus material 102a torn away. The sealed assembly is then reversed completing the assembly of the foot covering 101 which may be lasted at an elevated temperature as described in the case of the first embodiment.

While the two embodiments of the invention have been described and illustrated as being reversed or turned inside out after heat sealing it is obvious that in some cases the reversing operation may be omitted. However, it is generally preferred as the appearance of the reversed seal is generally better than the appearance of the tear side of the seal. Furthermore, the contour of the surface of the reversed foot covering is believed improved in appearance.

While the sole is described as being attached to the lower blank before the upper-lower seal is made, in some constructions, it may be desired to omit the sole. While tear seals are convenient in manufacture, it is obvious that non-tear seals may be used and the surplus material later cut away.

The foot coverings in accordance with the invention, if desired, may be provided with liners for warmth and comfort.

While the invention has been described and illustrated with reference to specific embodiments thereof it is to be understood that other embodiments may be resorted to without departing from the invention. For example, while forms of the upper have been shown it is apparent that variations in the design of the upper may be made. Therefore, the form of the invention set out above should be considered as illustrative and not as limiting the scope of the following claims.

We claim:

1. The method of making an electronically heat sealed foot covering of a desired width which comprises providing upper and lower blanks of thermoplastic sheeting, the upper blank being open along its counter portion, maintaining the lower blank in a substantially flat plane, positioning the upper blank in contact with the lower blank, heat sealing the upper to the lower using a flat die electrode of generally U-shape so as to make a heat seal which is spaced from the periphery of the sole at least in the region rearwardly of the shank, thereby providing a heat seal along the sides and toe portions of the periphery of the foot covering, positioning the ends of the upper together in its counter portion with the lower folded on itself in the heel region, heat sealing the contiguous parts of the counter and heel using a flat die electrode thereby forming a counter seal closing the back of the foot covering, placing the sealed assembly with its lower blank substantially flat, and making a heel seal using a flat die electrode across the lower blank in a direction generally perpendicular to the counter seal so as to pinch off excess material in the heel.

2. The method according to claim 1 in which a sole is provided and there is the additional step of heat sealing the sole to the lower blank before heat sealing the lower blank to the upper blank.

3. The method according to claim 1 in which the upper blank is formed of two sheets of material, and there is the additional step of heat sealing said two sheets together along the instep portion.

4. The method according to claim 1 in which there is the additional step of turning the foot covering inside out thereby providing a foot covering presenting reversed seams on the outer side.

5. The method according to claim 1 in which a liner is provided.

6. The method according to claim 1 in which a sole is provided, and there is the additional step of heat sealing the sole to the lower blank before heat sealing the lower blank to the upper blank, in which the upper blank is formed of two sheets of material and there is the additional step of heat sealing said two sheets together along the instep portion, in which there is the additional step of turning the foot covering inside out thereby providing a foot covering presenting reversed seams on the outer side, and in which a liner is provided.

References Cited by the Examiner

UNITED STATES PATENTS

| | | | |
|---|---|---|---|
| 2,714,771 | 8/1955 | Olfene | 36—9 |
| 2,732,633 | 1/1956 | Zeitz | 36—9 |
| 2,795,865 | 6/1957 | Backiel | 36—10 |
| 2,971,278 | 2/1961 | Scholl | 36—9 |

JORDAN FRANKLIN, *Primary Examiner.*

H. H. HUNTER, *Assistant Examiner.*